Figure 1:
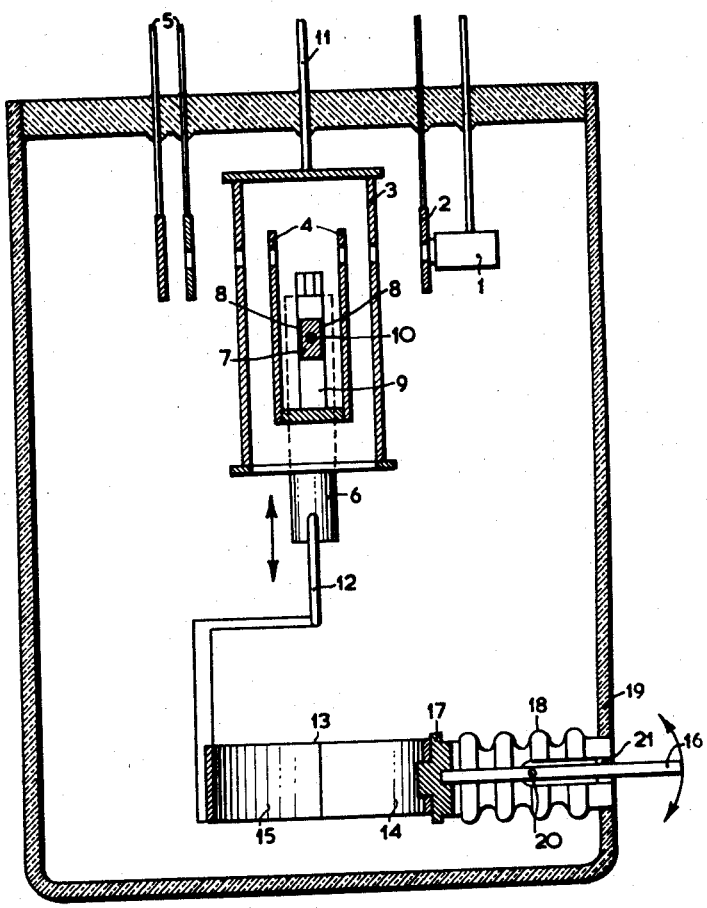

Aug. 25, 1959     F. COETERIER     2,901,656
LINKAGE MECHANISM

Filed April 4, 1957     3 Sheets-Sheet 1

INVENTOR
FREDERIK COETERIER
BY
AGENT

Aug. 25, 1959  F. COETERIER  2,901,656
LINKAGE MECHANISM

Filed April 4, 1957  3 Sheets-Sheet 2

INVENTOR
FREDERIK COETERIER
BY
AGENT

Aug. 25, 1959   F. COETERIER   2,901,656
LINKAGE MECHANISM

Filed April 4, 1957   3 Sheets-Sheet 3

INVENTOR
FREDERIK COETERIER
BY
AGENT

United States Patent Office 2,901,656
Patented Aug. 25, 1959

2,901,656
LINKAGE MECHANISM

Frederik Coeterier, Eindhoven, Netherlands, assignor to North American Philips Company, Inc., New York, N.Y., a corporation of Delaware Application April 4, 1957, Serial No. 650,744

Claims priority, application France April 13, 1956

2 Claims. (Cl. 313—148)

This invention relates to a linkage mechanism, and particularly to a mechanism for transmitting movements through a wall in such a way that curvilinear movements on one side of the wall are transformed into rectilinear movements on the other side.

In certain cases it is desirable for electrodes provided in the tube to be movable rectilinearly with respect to one another as, for example, in tuning an electrode system inside a vacuum tube to a given frequency. The present invention is particularly adapted to provide a relatively large rectilinear motion within the tube without excessively distorting the tube wall.

Several constructions are known in which use is made of resilient or flexible elements such as strips and the like, but the disadvantage was then usually involved that the electrodes were secured in the direction of movement in a resilient instead of a rigid manner, so that resilient vibrations may occur. Since the movement of the electrodes is usually effected with the purpose of varying a capacity or a tuned position such resilient vibrations are most undesirable. Other linkage mechanism depending on hinged members have also been known heretofore, but these suffered from play in the hinged joints and from excessive wear due to lack of lubrication when the lubricant was driven off during the evacuating process.

According to the invention a rod, pivoted so as to be able to move in a limited curvilinear path, is solidly connected, i.e., without intermediate hinged members, to a member which is constrained to slide in a rectilinear path. The non-hinged members connecting the rod to the sliding member include a short cylinder, or ring, part of the circumference of which is rigid and the remainder of which is flexible. The rigid part is connected to the rod, with the axis of the cylinder substantially parallel to the path of movement of the rod and substantially perpendicular to the axis of movement of the rod, and another rod, extending from the diametrically opposite and flexible portion of the cylinder along the direction of a generatrix of the cylinder, connects directly to the sliding member.

Figure 2:
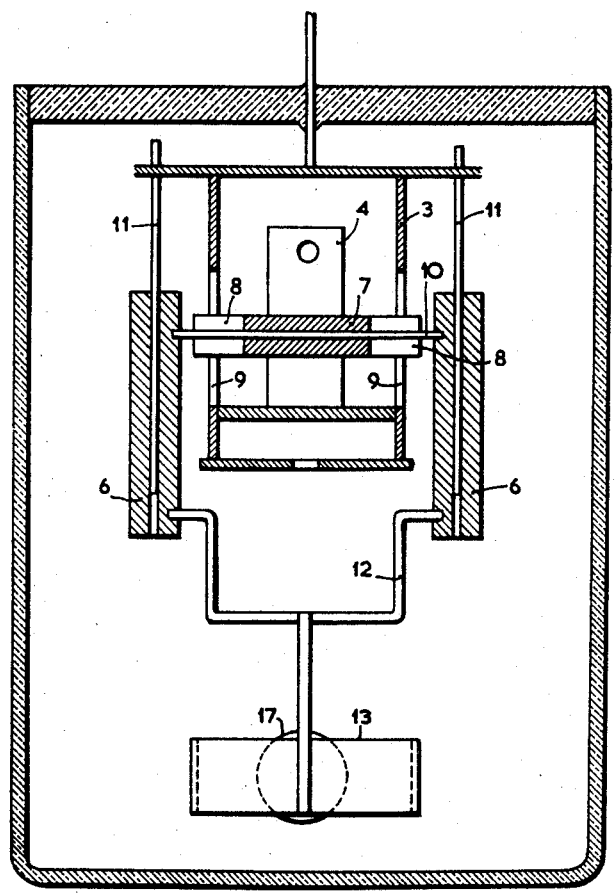
Figure 3:
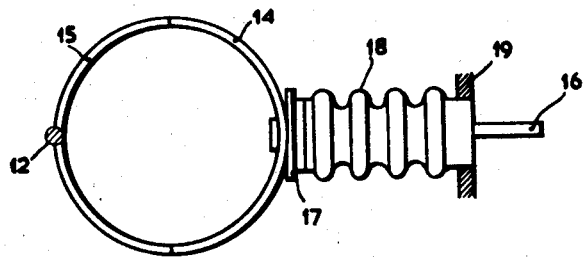
Figure 4:
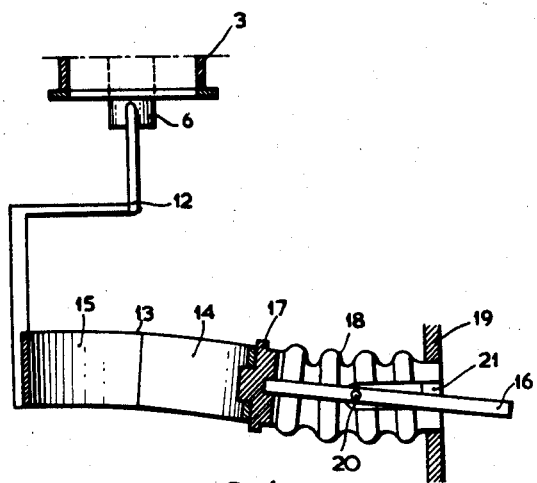

In order that the invention may be readily carried into effect, it will now be described more fully, by way of example, with reference to the accompanying drawings, in which:

Figs. 1 and 2 are side views of a tube including the linkage mechanism of the invention and Figs. 3 and 4 show details of part of the linkage mechanism according to the invention.

In Figs. 1 and 2, the cathode is indicated by 1, the Wehnelt cylinder by 2, the box-shaped anode by 3 and the ribbon-like Lecher line by 4. Reference numeral 5 indicates the reflector electrodes of a tube in which multiple reflection occurs. In order to tune the tube to the frequency desired, the impedance of the Lecher line 4 is varied by displacing in parallel thereto a small conductive rod 7 having a resilient contact strip 8 at each end, which strip slides along slot 9 provided in the wall of the box-shaped anode 3.

A central rod 10 connects the rod 7 to two small quartz tubes 6 which are each adapted to slide over a vertical rod 11 rigidly connected to the box-shaped anode 3.

The two quartz guide members 6 are connected to a bifurcated transmission member 12, welded to an intermediate member 13. The intermediate member 13 according to the invention converts the circular motion of the extremity of a lever 16 into a rectilinear movement of the fork 12. The lever 16 has pivots 20 which are located outside the tube on one axis. The lever 16 is connected to bellows 18 by means of a closure body 17 to which the cylindrical ring 13 is connected. The cylindrical ring 13 has a rigid portion 14 and a flexible portion 15. As may be seen from Figs. 3 and 4, the flexible portion is slightly deformed when the extremity of the lever 16 is moved to and fro with a curvilinear motion, so that the circular motion of the part 17 and of the ring 13 is converted into a rectilinear movement directed in accordance with the tangent to the curvilinear motion without the use of intermediate pivots. It has been found that if the part 15 has a certain axial length, preferably, but not necessarily, equal to approximately the radius of ring 13, and if this part is smaller than the rigid part 14 of the ring, for example, includes only abount one-third of the circumference of the ring 13, the straight guide provided by means of the quartz tubes 6 is unnecessary since the fork 12 is then moved rectilinearly of its own accord, guided only by the slots 9. Since the ring is comparatively wide and secured with its rigid part 14 to the lever 16, the rod 7 is driven in a manner which is not resilient in the direction of the movement so that resilient vibration of the rod 7 in this direction does not occur.

Although the linkage mechanism has been discussed in relation to a particular type vacuum tube, it will be obvious to those skilled in the art that it may be applied to other types of vacuum tubes and to non-evacuated structures. Consequently, the scope is limited only by the following claims.

What is claimed is:

1. An electron discharge tube comprising an evacuated envelope; a flexible section in the wall of said envelope; a first rod extending through said flexible section and being pivoted to move in a limited orbital path; a hollow cylindrical member comprising a relatively rigid section including approximately ⅔ of the circumference thereof and a relatively flexible section including the remainder of the circumference thereof, said rod being attached to the central part of said rigid section with the axis of said cylindrical member substantially parallel to the plane of movement of said rod and substantially perpendicular to the axis of movement of said rod; a second rod having one end connected to the central part of said flexible section diametrically opposite said central part of said rigid section and extending along a generatix of said cylindrical member; and an electrode constrained to move along a rectilinear path within said envelope, said electrode being connected to the other end of said second rod.

2. An electron discharge tube comprising an evacuated envelope; a flexible section in the wall of said envelope; a first rod extending through said flexible section; means pivoting said first rod to move the same in a limited curvilinear path; a hollow cylindrical member comprising a relatively rigid section and a relative flexible section;

said first rod being operatively connected to the central part of said rigid section with the axis of said cylindrical member substantially parallel to the plane of movement of said rod and substantially perpendicular to the axis of movement of said rod; a second rod having one end connected to the central part of said flexible section diametrically opposite said central part of said rigid section and extending along a generatrix of said cylindrical member; and an electrode constrained to move along a rectilinear path within said envelope, said electrode being connected to the other end of said second rod.

References Cited in the file of this patent

UNITED STATES PATENTS

| | | |
|---|---|---|
| 2,099,244 | Temple | Nov. 16, 1937 |
| 2,142,857 | McArthur | Jan. 3, 1939 |
| 2,155,419 | Gunn | Apr. 25, 1939 |
| 2,521,545 | Shepherd | Sept. 5, 1950 |
| 2,757,549 | Dale | Aug. 7, 1956 |